Dec. 6, 1960   W. A. RICHARDS ET AL   2,963,651
INSTRUMENT ZERO ADJUSTERS
Filed Dec. 12, 1958   2 Sheets-Sheet 1

United States Patent Office 2,963,651
Patented Dec. 6, 1960

2,963,651
INSTRUMENT ZERO ADJUSTERS

Wilfred Arthur Richards, London, and Jack Richard Price and Kenneth Frank Davis, Stafford, England, assignors to The English Electric Company Limited, London, England, a company of Great Britain Filed Dec. 12, 1958, Ser. No. 779,947

Claims priority, application Great Britain Dec. 16, 1957

7 Claims. (Cl. 324—154)

This invention relates to electric indicating instruments and especially, though not exclusively, to extended scale instruments, that is to say instruments having a scale reading extending over 180° or more.

In extended scale instruments it is convenient to have a zero adjusting device in the form of a button substantially coaxial with the pivot axis of the instrument.

According to the invention, an electric indicating instrument is provided with zero adjusting means comprising a rotary button member provided with an eccentric, a slidable member operated by said eccentric for sliding motion and a toothed connection between said slidable member and a further rotary member rotatable about the pivot axis of the instrument for adjustment of the anchor point of the instrument control spring. The first mentioned rotary member may be substantially coaxial with the pivot axis of the instrument. In common with other similar zero adjusting devices, the zero adjusting button has two possible positions for any particular setting, these positions being approximately 180° apart. With the zero adjuster according to the present invention, however, the sensitivity of adjustment is the same whichever of the two positions the button happens to occupy.

The toothed connection referred to may be a multi-toothed connection on both parts, but preferably the sliding member has a single tooth and the rotary member is provided with multiple teeth since this has advantages which will be referred to hereinafter.

Preferably the toothed connection is disengageable in at least one extreme position of the slidable member so that the rotary member can be set to any one of a number of initial positions. In this way the zero position of the instrument may be made to correspond to different parts of the instrument scale. This extreme position of the slidable member is not necessarily that reached in operation of the zero button, but may be a position beyond to which the member can be set while the necessary adjustment of the approximate zero position is made. Since the adjustment resulting from use of the button is small, a single tooth is all that is required on one of the parts forming the toothed connection. Preferably the teeth on the rotary member extend completely round its periphery so that the zero position may be set to any part of the instrument scale, irrespective of how the spring is attached to this rotary member.

Figure 1:
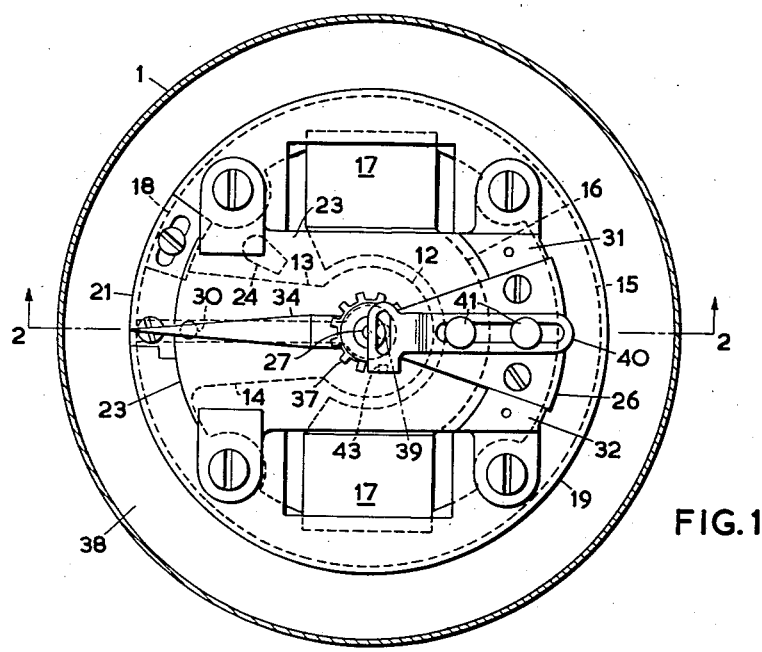
Figure 2:
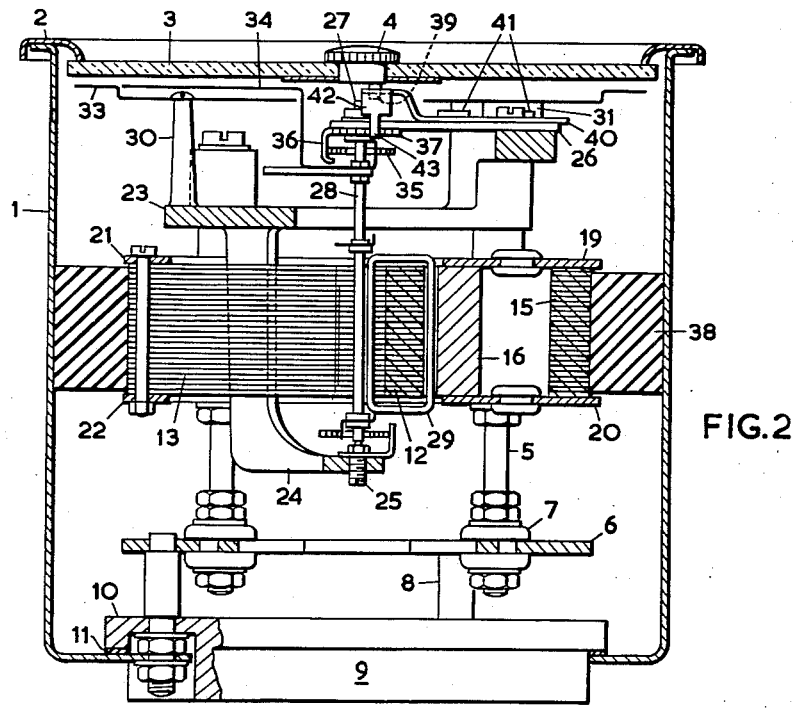
Figure 3:
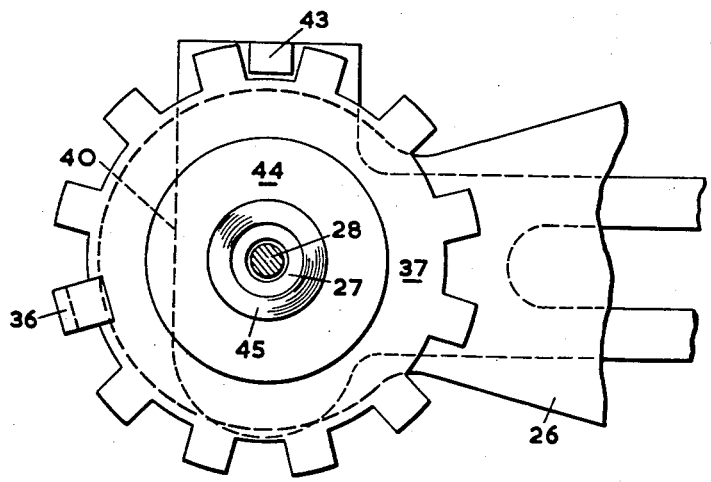

Other features of the invention will be apparent from the accompanying drawing in which Fig. 1 is a plan view of an instrument with the dial plate and front cover removed, Fig. 2 is a section on the line 2—2 of Fig. 1, and Fig. 3 is an enlarged view, seen from below, of the upper bridge of the instrument.

Referring to the drawing, the instrument is arranged in a casing 1 closed by a top bezel 2 to which is fitted a window 3. The window 3 is provided with a central hole in which a zero adjustment button 4 is rotatably arranged. The instrument is supported in the casing 1 by pillars 5 which are secured to a plate 6 through rubber bushes 7 to form a shock absorbing mounting. The plate 6 carries further pillars 8, nuts on which engage both the rear of the casing 1 and a terminal block 9. The terminal block 9 is provided with a peripheral flange 10 between which and the inner face of the rear of the casing 1 is located a joint making packing 11.

The magnet system of the instrument comprises a hollow central pole 12, two radial legs 13 and 14, and an encircling yoke 15 made up of a stack of single piece laminations. An outer pole is provided by a part-circular pole piece 16 between which and the yoke 15 permanent magnets 17 are arranged. The magnets 17 will be magnetized so that like poles are facing each other. The magnetic circuit is completed by a gate piece 18 of corresponding laminations which closes the gap between the outer end of the leg 13 and the extremity of the yoke 15. The laminations, together with the permanent magnet assembly, are clamped together by top and bottom clamping plates 19 and 20 and the gate piece 18 is clamped by separate top and bottom plates 21 and 22 which are arranged to interlock with the plates 19 and 20.

The pillars 5 pass through the holes in the laminations forming the yoke 15 and through the plates 19 and 20 and serve to locate and clamp in position a movement holder 23. The movement holder 23 is provided with an integral bracket 24 extending down through the magnet system to support a lower jewel bearing 25 for the moving coil system and with a bridge 26 carrying a corresponding upper jewel bearing 27. A staff 28 extends between the upper and lower jewel bearings and carries a moving coil 29 so as to swing in the gap formed between the central pole 12 and the pole piece 16. The movement holder 23 is also provided with a pillar 30 and two upstanding portions 31 and 32 to support the dial plate 33 which is secured to them by means of flat headed screws. A pointer 34 is carried by the staff 28 and its return to a zero position is assured by a hair spring 35 one end of which is connected to the staff 28 and the other end to a depending tongue 36 on a frictionally held rotary member 37 arranged to be rotatable about the axis of the staff 28. The magnet system is supported inside the casing additionally by means of a ring 38 of resilient material.

The rotary member 37 is frictionally held by being urged against the underside of the bridge 26 by a circular spring washer 44 which is held in place by a tubular rivet 45 through which the jewel bearing 27 extends. This will be seen more clearly from the enlarged detail of Figure 3.

The button 4 is provided with an eccentric peg 39 which engages a transverse slot in an elongated slidable member 40 which is secured to the bridge 26 by means of shouldered rivets 41 extending through a longitudinal slot in the member 40. The member 40 has on one side a bent-over portion 42 carrying a tooth 43 in line with the slot engaged by the peg 39.

The sliding motion of the member 40 permitted by the position of the rivets 41 is greater than that which will be imparted to it in normal operation of the button 4. Thus, as seen in Figures 1 and 2 of the drawings, the member 40 may be moved by hand, when the instrument is out of its case, to the right, thus disengaging the tooth 43 from the gap between two adjacent teeth on the member 37. Thus the member 37 can be rotated so as to bring the zero position of the pointer 34 to a point just beyond a desired position on the scale if the member 37 is being rotated anti-clockwise as seen in Fig. 1, or just short of that position if the member is being rotated clockwise. Re-engagement of the tooth 43 by sliding the member 40 to an approximately central position as shown in Figure 3 will then cause the pointer to indicate near enough to zero to be capable of adjustment by the zero button 4. The use of a single tooth on the member 40 enables this procedure to be carried out when this member is moved either to the right or to the left with a minimum of additional movement.

The number of teeth on the member 37 is chosen so that the pitch corresponds to the adjustment obtainable by operation of the zero button 4.

The zero adjusting mechanism of the invention utilizes fewer parts than is usual with some other types of adjuster since there is no necessity to provide angular adjustment, frictionally controlled or otherwise, between a member the movement of which is controlled by operation of a zero button and a member to which the instrument return spring is anchored.

What we claim as our invention and desire to secure by Letters Patent is:

1. An electric indicating instrument having an indicating member mounted for rotation about a pivot axis and provided with zero adjusting means comprising a rotary button member provided with an eccentric, a slidable member operated by said eccentric for sliding motion, a further rotary member rotatable about said pivot axis, an instrument control spring for biasing said indicating member anchored to said further rotary member, and a toothed connection between said slidable member and said further rotary member for adjustment of the anchor point of said instrument control spring.

2. An electric indicating instrument according to claim 1, wherein the toothed connection consists of a single tooth on said slidable member and multiple teeth on said further rotary member.

3. An electric indicating instrument according to claim 2, wherein said toothed connection is disengageable in at least one extreme position of the slidable member so that said further rotary member can be set to any one of a number of initial positions.

4. An electric indicating instrument according to claim 3, wherein said extreme position of the slidable member is a position beyond which said slidable member can be operated by said eccentric to set said further rotary member to said any one of a number of initial positions.

5. An electric indicating instrument according to claim 3, wherein the pitch of the teeth on said further rotary member is chosen so as to correspond to the adjustment obtainable by operation of the rotary button member.

6. An electric indicating instrument according to claim 3, wherein the teeth on said further rotary member extend completely around its periphery.

7. An electric indicating instrument according to claim 1, wherein said rotary button member is substantially coaxial with the pivot axis of the instrument.

References Cited in the file of this patent

UNITED STATES PATENTS

| 1,708,900 | Roller | Apr. 9, 1929 |
| 2,231,609 | Anderson | Feb. 11, 1941 |
| 2,720,187 | Lamb | Oct. 11, 1955 |

FOREIGN PATENTS

| 331,784 | Great Britain | July 10, 1930 |
| 577 | Great Britain | May 29, 1946 |